O. BILLINGSLEY.
PLOW.
APPLICATION FILED NOV. 30, 1917.
1,321,083.
Patented Nov. 11, 1919.
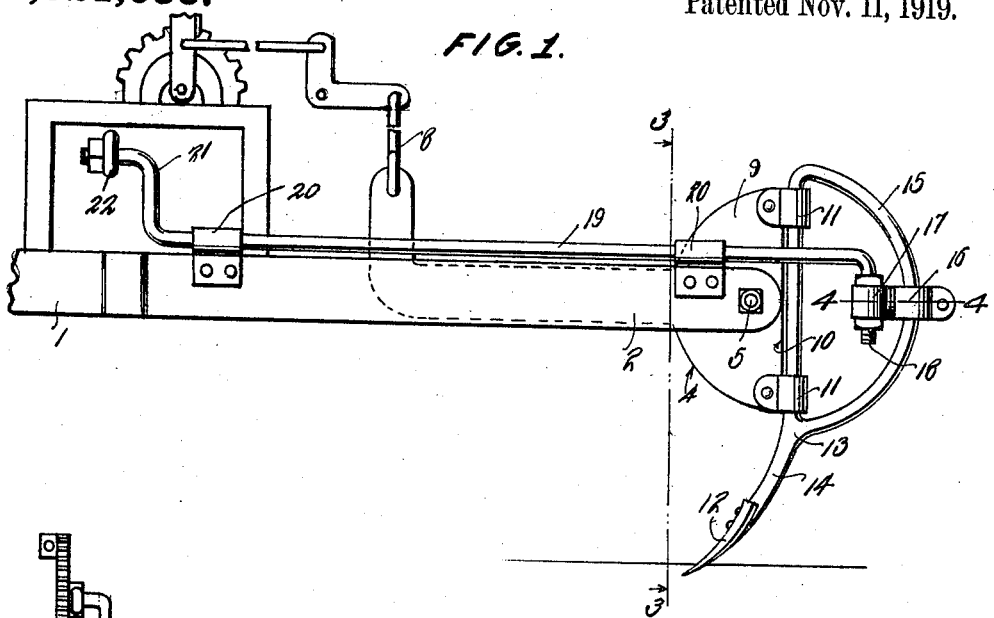
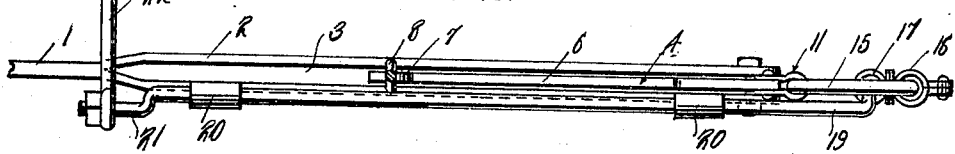
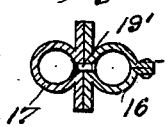
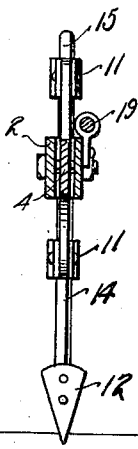
WITNESSES
W. C. Fielding.
Irving L. McCathran.
INVENTOR
Oliver Billingsley
BY Richard Bowen.
ATTORNEY

UNITED STATES PATENT OFFICE.

OLIVER BILLINGSLEY, OF FREDERICK, OKLAHOMA, ASSIGNOR OF ONE-HALF TO AUSTIN PERRYMAN, OF FREDERICK, OKLAHOMA.

PLOW.

1,321,083.    Specification of Letters Patent.    Patented Nov. 11, 1919.

Application filed November 30, 1917. Serial No. 204,760.

*To all whom it may concern:*

Be it known that I, OLIVER BILLINGSLEY, a citizen of the United States, residing at Frederick, in the county of Tillman and State of Oklahoma, have invented certain new and useful Improvements in Plows, of which the following is a specification.

This invention relates to a double adjustable blade and has for its object the production of a simple and efficient means for regulating the draft of the cultivator blade and also for swinging the blade toward or away from the row of growing crops.

Another object of this invention is the production of a simple and efficient means for swinging the blade carrying member to suit the desire of the operator.

With these and other objects in view this invention consists of certain novel constructions, combinations and arrangements of parts as will be hereinafter fully described and claimed.

In the drawings:—

Figure 1 is a side elevation of the supporting means for the plow or cultivator blade, Fig. 2 is a top plan view of the structure shown in Fig. 1, Fig. 3 is a section taken on line 3—3 of Fig. 1, Fig. 4 is a transverse sectional view through the connection between the clamp which is carried by the plow joint supporting standard and the sleeve which is carried by the operating rod.

By referring to the drawings, it will be seen that 1 designates the plow beam which is provided with a pair of spaced arms 2 for producing a pocket 3 between the arms 2. A blade supporting plate 4 is pivotally mounted between the arms 2 upon a pivot pin 5. This plate 4 is provided with a forwardly extending arm 6 which arm 6 is provided with an upwardly extending end 7 to which may be connected any suitable operating link 8. The plate 4 is provided with an enlarged rear end 9 in the form of a bisected circle and this rear end 9 is provided with a straight rear face 10 upon which is secured a plurality of journal brackets 11. A plow blade 12 is supported upon a standard 13 as shown in Fig. 1. The standard 13 comprises an upper loop 15 upon which the clamp 16 is secured. This clamp 16 carries a pivotally mounted sleeve 17 within which sleeve 17 is mounted the depending end 18 of the operating shaft 19, the clamp 16 and sleeve 17 being pivotally connected on a horizontal pivot 19′.

It should be understood that the loop 15 is provided with the bowed portion formed on the arc of a circle struck from the pivot point 5 and as the plate 4 is moved or swung upwardly or downwardly, the bowed portion of the loop 15 will slide through the clamp 16, without interfering with the operation or position of the operating shaft 19 referred to in the following specification. It should be understood that the clamp 16 is secured to the bowed portion of the loop 15 in such a manner as to prevent the same from being accidentally displaced or disengaged from the loop 15 but at the same time permitting the sliding of the bowed portion of the loop 15 through the clamp 16 as will be obvious when considering the fact that the plate 4 is adapted to be swung upon its pivot point 5.

The operating shaft 19 is carried by the journal plates 20 which plates are supported upon the beam 1 and this shaft 19 is provided with an offset end 21 to which offset end is connected an operating link 22.

When it is desired to regulate the depth at which the blade 12 is to dig into the ground, the forwardly extending arm 6 of the plate 4 may be raised or lowered to attain the object desired. The standard 13 may be swung laterally to cause the plow blade 12 to scrape toward or away from the row of growing crops by rotating the operating rod 19 and consequently swinging the clamp 16 laterally as the end 18 of the rod 19 is raised or lowered.

From the foregoing description it will be seen that a very simple and efficient device has been produced for regulating the operation of the plow blade 12, by not only regulating the draft of the blade 12 but also shifting the position thereof.

It should be understood that any number of plow beams may be employed, or in other words the device may be multiplied to any extent desired and further that any suitable operating means may be connected to the operating links 8 and 22 without departing from the spirit of the invention.

What is claimed is:—

1. A plow of the class described comprising a plow beam, said plow beam provided with spaced ends, a supporting plate pivotally mounted between said ends and adapted to be raised and lowered for regulating the draft of a plow carried thereby, said plate provided with an enlarged rear end, a standard, said standard provided with a loop upon the top thereof, means for hinging said loop to said enlarged rear end, a sleeve connected to said loop, an operating lever provided with an offset forward end, and said operating lever provided with a depending rear end for engaging said sleeve and swinging said standard laterally as said operating rod is rotated.

2. A plow comprising a beam, supporting means pivoted upon said beam for vertical swinging movement, a standard hinged to said supporting means for lateral swinging movement, means connected to said standard for swinging the same, and means for raising and lowering said supporting means.

3. A plow comprising a beam, a standard supporting said beam, a blade carried by said standard, a sleeve secured to said standard, an operating shaft carried by said sleeve, said operating shaft provided with an off-set end engaging said sleeve and adapted to swing said standard laterally as said shaft is rotated.

4. A plow comprising a beam, a standard, a supporting plate for supporting said standard pivotally in engagement with said beam, said standard provided with a bowed portion formed on the arc of a circle struck from the pivot point of said supporting plate, a sleeve secured to said standard and capable of sliding upon said bowed portion, an operating shaft carried by said sleeve and connected to said sleeve by a swivel connection, said operating shaft provided with an offset end engaging said swivel connection and adapted to swing said standard laterally as said shaft is rotated.

In testimony whereof I affix my signature in presence of two witnesses.

OLIVER BILLINGSLEY.

Witnesses:
J. C. ROSSON,
W. P. STAGG.

Copies of this patent may be obtained for five cents each, by addressing the "Commissioner of Patents, Washington, D. C."